(12) United States Patent
Bhamri et al.

(10) Patent No.: US 12,199,716 B2
(45) Date of Patent: Jan. 14, 2025

(54) PERFORMING CHANNEL OCCUPANCY TIME SENSING

(71) Applicant: Lenovo (Singapore) Pte. Ltd., New Tech Park (SG)

(72) Inventors: Ankit Bhamri, Rödermark (DE); Karthikeyan Ganesan, Kronberg im Taunus (DE); Alexander Johann Maria Golitschek Edler von Elbwart, Darmstadt (DE); Ali Ramadan Ali, Kraiburg am Inn (DE)

(73) Assignee: Lenovo (Singapore) Pte. Ltd., New Tech Park, Singapore (SG)

( * ) Notice: Subject to any disclaimer, the term of this patent is extended or adjusted under 35 U.S.C. 154(b) by 80 days.

(21) Appl. No.: 18/249,150

(22) PCT Filed: Oct. 14, 2021

(86) PCT No.: PCT/IB2021/059467
§ 371 (c)(1),
(2) Date: Apr. 14, 2023

(87) PCT Pub. No.: WO2022/079663
PCT Pub. Date: Apr. 21, 2022

(65) Prior Publication Data
US 2023/0403055 A1 Dec. 14, 2023

Related U.S. Application Data

(60) Provisional application No. 63/093,055, filed on Oct. 16, 2020.

(51) Int. Cl.
*H04B 7/06* (2006.01)
*H04W 74/0808* (2024.01)

(52) U.S. Cl.
CPC ...... *H04B 7/0617* (2013.01); *H04W 74/0808* (2013.01)

(58) Field of Classification Search
CPC . H04B 7/0617; H04B 7/088; H04W 74/0808; H04W 74/006
(Continued)

(56) References Cited

U.S. PATENT DOCUMENTS

| 2022/0124807 A1* | 4/2022 | Hu | H04W 74/006 |
| 2023/0072340 A1* | 3/2023 | El Hamss | H04B 1/74 |

(Continued)

FOREIGN PATENT DOCUMENTS

| WO | WO-2019173365 A1 * | 9/2019 | ........... H04B 7/0695 |
| WO | 2019210185 A1 | 10/2019 | |

OTHER PUBLICATIONS

PCT/IB2021/059467, "Notification of Transmittal of the International Search Report and the Written Opinion of the International Searching Authority, or the Declaration", International Searching Authority, Jan. 17, 2022, pp. 1-12.

(Continued)

*Primary Examiner* — Emmanuel Bayard
(74) *Attorney, Agent, or Firm* — Kunzler Bean & Adamson

(57) ABSTRACT

Apparatuses, methods, and systems are disclosed for performing channel occupancy time sensing. One method includes receiving information configuring a single channel occupancy time for multi-beam transmission in an unlicensed channel. The method includes performing sensing for the single channel occupancy time. The sensing includes: omni-directional sensing at a beginning of the single channel occupancy time; directional sensing on a plurality of beams at the beginning of the single channel occupancy time; directional sensing on the plurality of beams in a time
(Continued)

domain multiplexing manner before each transmission based on a time gap between transmissions; or some combination thereof.

20 Claims, 9 Drawing Sheets

(58) Field of Classification Search
USPC .................................................. 375/267, 299
See application file for complete search history.

(56) References Cited

U.S. PATENT DOCUMENTS

| 2023/0209597 | A1* | 6/2023 | Salim | ................ | H04W 74/0808 370/329 |
| 2023/0379092 | A1* | 11/2023 | Chin | ................... | H04W 72/232 |
| 2024/0196435 | A1* | 6/2024 | Hu | .................... | H04W 74/0816 |

OTHER PUBLICATIONS

Qualcomm Inc., "Email discussion on channel access mechanism for 52.6GHz-71GHz band", 3GPP TSG RAN WG1 Meeting #102-e R1-200xxxx, ETSI EN 302 567 v2.1.20, Aug. 17-24, 2020, pp. 1-13.

NTT Docomo, Inc., "Channel access procedures for NR-U operation", 3GPP TSG RAN WG1 Meeting #95 R1-1813313, Nov. 12-16, 2018, pp. 1-5.

Qualcomm, "New WID on Extending current NR operation to 71 GHz", 3GPP TSG RAN Meeting #86 RP-193229, Dec. 9-12, 2019, pp. 1-5.

Intel Corp., "New SID: Study on supporting NR from 52.6GHz to 71 GHz", 3GPP TSG RAN Meeting #86 RP-193259, Dec. 9-12, 2019, pp. 1-3.

3GPP, "3rd Generation Partnership Project; Technical Specification Group Radio Access Network; Study on NR-based access to unlicensed spectrum (Release 16)", 3GPP TR 38.889 V16.0.0, Dec. 2018, pp. 1-119.

3GPP, "3rd Generation Partnership Project; Technical Specification Group Radio Access Network; NR; Physical channels and modulation (Release 16)", 3GPP TS 38.211 V16.2.0, Jun. 2020, pp. 1-131.

Lenovo, Motorola Mobility, "Channel access mechanisms for NR from 52.6 GHz to 71GHz", 3GPP TSG RAN WG1 #106-e R1-2106836, Aug. 16-27, 2021, pp. 1-18.

* cited by examiner

PERFORMING CHANNEL OCCUPANCY TIME SENSING

CROSS-REFERENCE TO RELATED APPLICATIONS

This application claims priority to U.S. Patent Application Ser. No. 63/093,055 entitled "APPARATUSES, METHODS, AND SYSTEMS FOR CHANNEL OCCUPANCY FOR UNLICENSED BANDS BEYOND 52.6 GHZ" and filed on Oct. 16, 2020 for Ankit Bhamri, which is incorporated herein by reference in its entirety.

FIELD

The subject matter disclosed herein relates generally to wireless communications and more particularly relates to performing channel occupancy time sensing.

BACKGROUND

In certain wireless communications networks, there may be a channel occupancy time. Transmission during a channel occupancy time may not be efficient.

BRIEF SUMMARY

Methods for performing channel occupancy time sensing are disclosed. Apparatuses and systems also perform the functions of the methods. One embodiment of a method includes receiving, at a user equipment, information configuring a single channel occupancy time for multi-beam transmission in an unlicensed channel. In some embodiments, the method includes performing sensing for the single channel occupancy time. The sensing includes: omni-directional sensing at a beginning of the single channel occupancy time; directional sensing on a plurality of beams at the beginning of the single channel occupancy time; directional sensing on the plurality of beams in a time domain multiplexing manner before each transmission based on a time gap between transmissions; or some combination thereof.

One apparatus for performing channel occupancy time sensing includes a user equipment. In some embodiments, the apparatus includes a receiver that receives information configuring a single channel occupancy time for multi-beam transmission in an unlicensed channel. In various embodiments, the apparatus includes a processor that performs sensing for the single channel occupancy time. The sensing includes: omni-directional sensing at a beginning of the single channel occupancy time; directional sensing on a plurality of beams at the beginning of the single channel occupancy time; directional sensing on the plurality of beams in a time domain multiplexing manner before each transmission based on a time gap between transmissions; or some combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered as limiting of scope, the embodiments will be described and explained with additional specificity and detail through the use of the accompanying drawings, in which.

DETAILED DESCRIPTION

Figure 1:
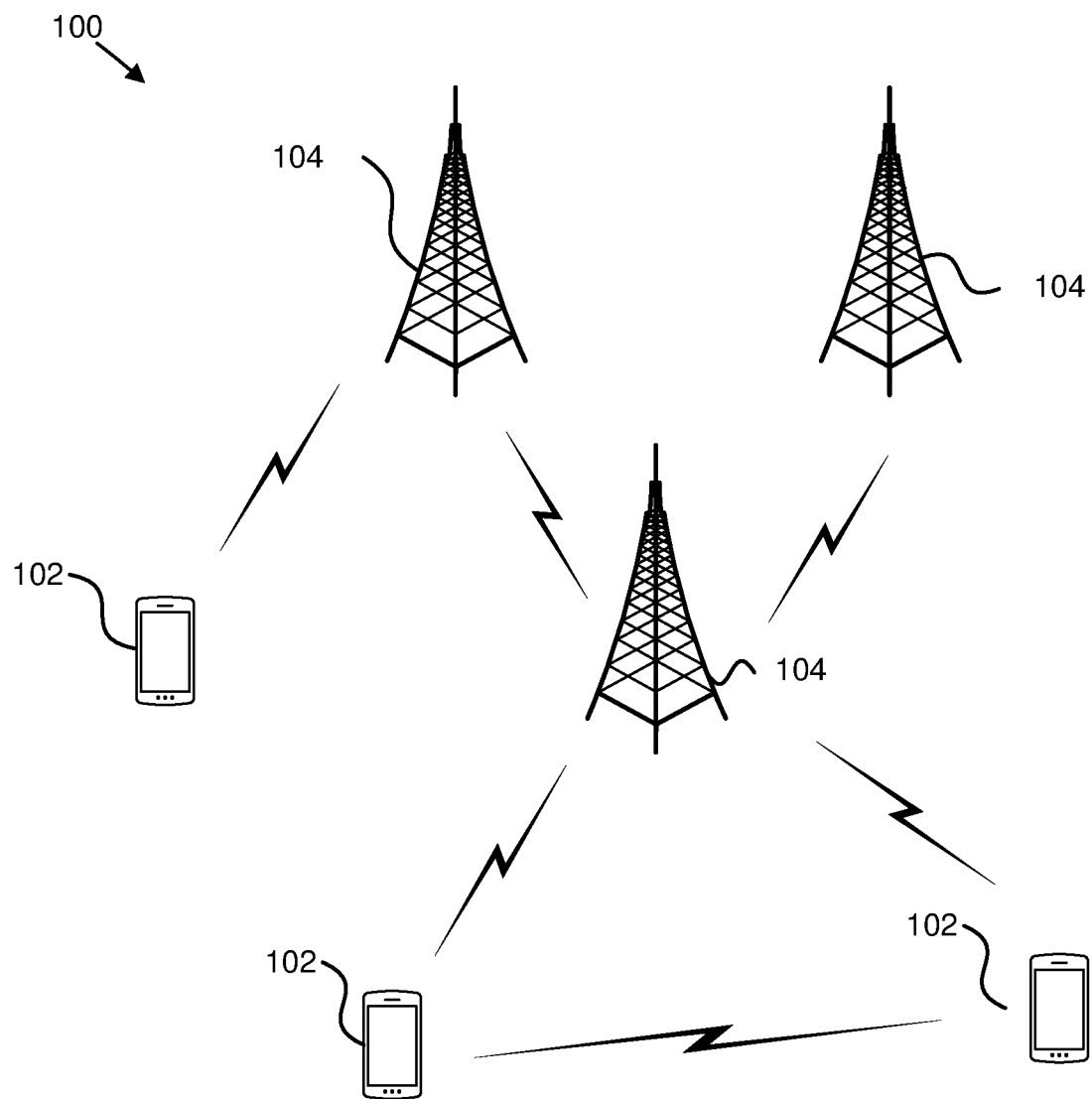
FIG. 1 is a schematic block diagram illustrating one embodiment of a wireless communication system for performing channel occupancy time sensing.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures Like numbers refer to like elements in all figures, including alternate embodiments of like elements.

FIG. 1 depicts an embodiment of a wireless communication system 100 for performing channel occupancy time sensing. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive information configuring a single channel occupancy time for multi-beam transmission in an unlicensed channel. In some embodiments, the remote unit 102 may perform sensing for the single channel occupancy time. The sensing includes: omni-directional sensing at a beginning of the single channel occupancy time; directional sensing on a plurality of beams at the beginning of the single channel occupancy time; directional sensing on the plurality of beams in a time domain multiplexing manner before each transmission based on a time gap between transmissions; or some combination thereof. Accordingly, the remote unit 102 may be used for performing channel occupancy time sensing.

Figure 2:
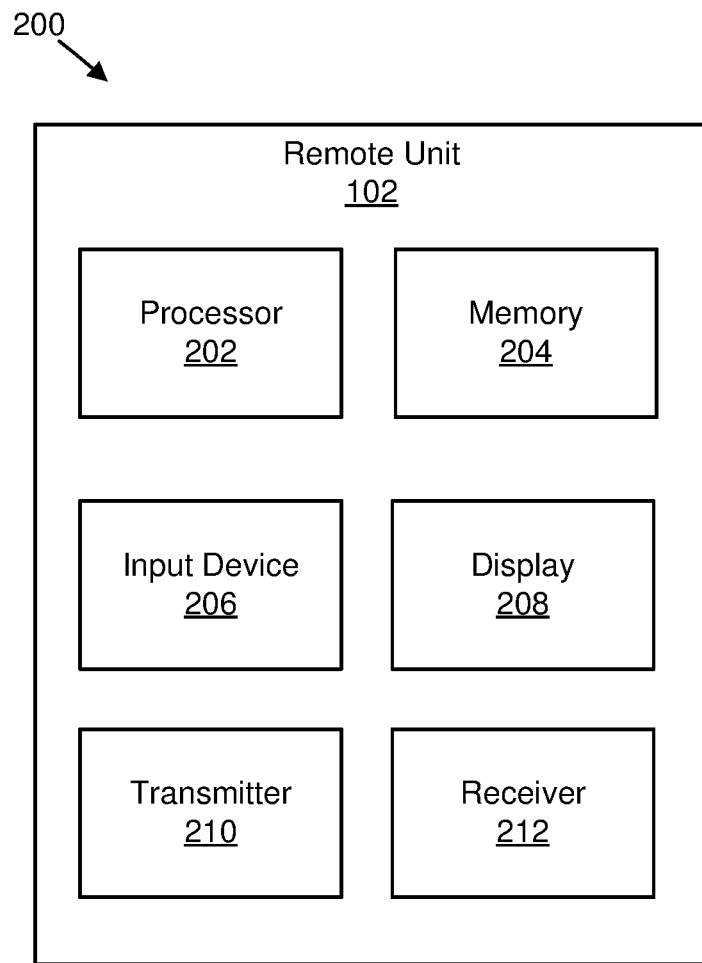
FIG. 2 is a schematic block diagram illustrating one embodiment of an apparatus that may be used for performing channel occupancy time sensing.

FIG. 2 depicts one embodiment of an apparatus 200 that may be used for performing channel occupancy time sensing. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212 receives information configuring a single channel occupancy time for multi-beam transmission in an unlicensed channel. In various embodiments, the processor 202 performs sensing for the single channel occupancy time. The sensing includes: omni-directional sensing at a beginning of the single channel occupancy time; directional sensing on a plurality of beams at the beginning of the single channel occupancy time; directional sensing on the plurality of beams in a time domain multiplexing manner before each transmission based on a time gap between transmissions; or some combination thereof.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
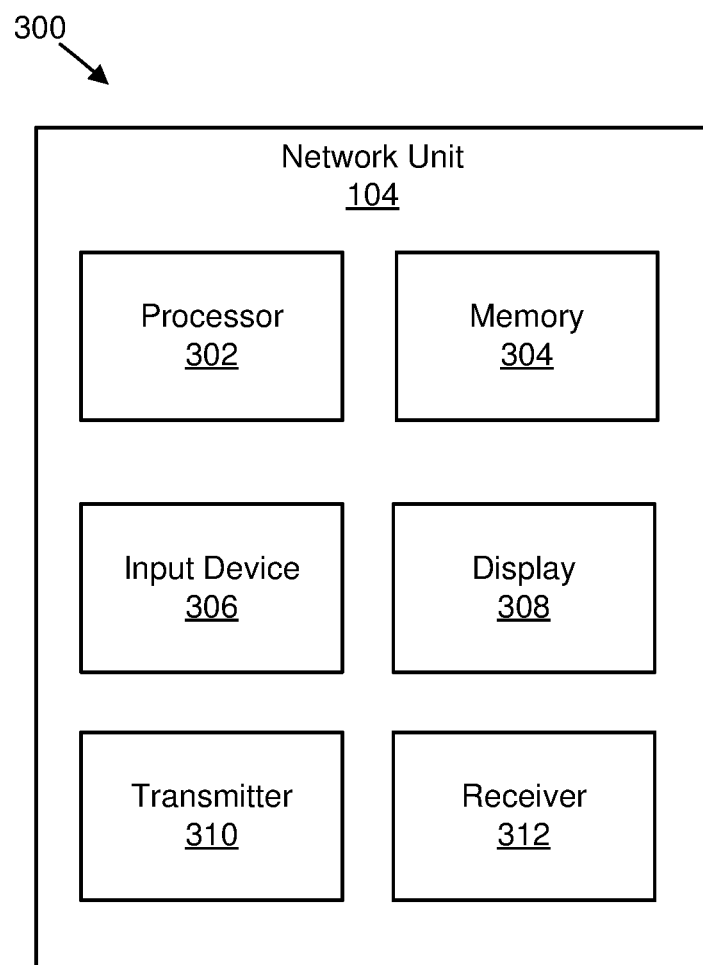
FIG. 3 is a schematic block diagram illustrating one embodiment of an apparatus that may be used for performing channel occupancy time sensing.

FIG. 3 depicts one embodiment of an apparatus 300 that may be used for performing channel occupancy time sensing. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, a channel occupancy with listen-before talk ("LBT") may be determined, maintained, and/or released if beam-based transmission and/or reception is expected for new radio ("NR") unlicensed ("U") ("NR-U") in a high frequency range such as beyond 52.6 GHz. In some embodiments, only omni-directional LBT is supported in NR-U and GHz Wi-Fi ("WiGig") systems and channel occupancy regulatory requirements and specifications in standards may be supported only with omni-directional LBT. In various embodiments, where beam-based LBT is applied in NR-U, then it may be unclear whether a channel occupancy is going to be associated with each beam or each transmitter device. In certain embodiments, depending upon how an association is done, there may be various ways to handle channel occupancy (e.g., considering transmissions and/or repetitions on different beams within the remaining channel occupancy time ("COT") and different beam hopping patterns).

In some embodiments, clear channel assessment may be done in a directional manner in a first beam if a first transmission is scheduled for a transmitter device and, upon success, COT is initiated by a transmitter device and, if the transmitter is configured to share a remaining COT duration with a second beam, then the transmitter is required to perform only short directional LBT (for example LBT Cat 2) on the second beam or no LBT based on certain criteria. Upon success of the directional LBT on second beam, the transmitter may start transmission on the second beam but within the same COT duration (e.g., remaining COT duration) that is on-going from the first beam (e.g., no new COT is started for the second beam if the COT for the first beam is still on-going).

In various embodiments, a combination of omni-directional LBT for initiating COT and no LBT based beam access mechanism for initiating directional transmissions on specific beams may be configured and/or indicated to a transmitter device. For example, if a transmitter device is scheduled for transmission, then the transmitter device performs omni-directional LBT and upon successful LBT, COT is initiated. To access a beam within the initiated COT for actual transmissions, a transmitter device may be required to follow at least one of the non LBT based channel access mechanism (e.g., dynamic frequency selection ("DFS"), automatic transmit power control ("ATPC"), etc.) or use long term sensing on specific beams. So, although COT is initiated, the transmission is not guaranteed unless it can be guaranteed that there is not going to be interference to other systems above a certain threshold.

In certain embodiments, if directional LBT is performed for specific beams of a transmitter device, COT may be determined for specific beams of that transmitter device and, if multiple COTs corresponding to multiple beams of the same transmitter device are overlapping in time, then the transmission gap for any of beam-specific COT may be considered only if there is no on-going transmission on any of the beams during their corresponding COTs (e.g., even if there is transmission on one beam within its corresponding COT), then it may be assumed that all the beam-specific COTs that overlap also have on-going transmission and, hence, no gap may be assumed.

In some embodiments described herein, there may be fair access to a channel during beam switching procedures and avoiding transmission gaps that could result in a loss of a channel.

In various embodiments, a clear channel assessment ("CCA") for initiating a COT may follow a Category 3 or Category 4 channel access, and CCA within a COT, where applicable, may follow a Category 1 or Category 2 channel access. A Category 1 or 2 channel access may be known as short LBT or one-shot LBT due to its generally shorter duration compared to Category 3 or Category 4 channel access.

In certain embodiments, directional CCA and/or LBT and directional transmission and/or reception may be assumed for a gNB and/or device, if an explicit direction and/or beam is configured and/or indicated. In some embodiments, a beam or directional communication is indicated based on quasi-co location ("QCL") assumption type-D. Similar interpretation may be extended to directional CCA and/or LBT if the sensing is done in a specific beam direction based on the QCL assumption type-D that may either be explicitly indicated for any channel access mechanism or a similar QCL assumption as transmission and/or reception can be assumed, for which the sensing is being done. For omni-directional LBT and, no specific beam and/or direction is configured and/or indicated, for example no QCL type-D is indicated for a device.

Figure 4:
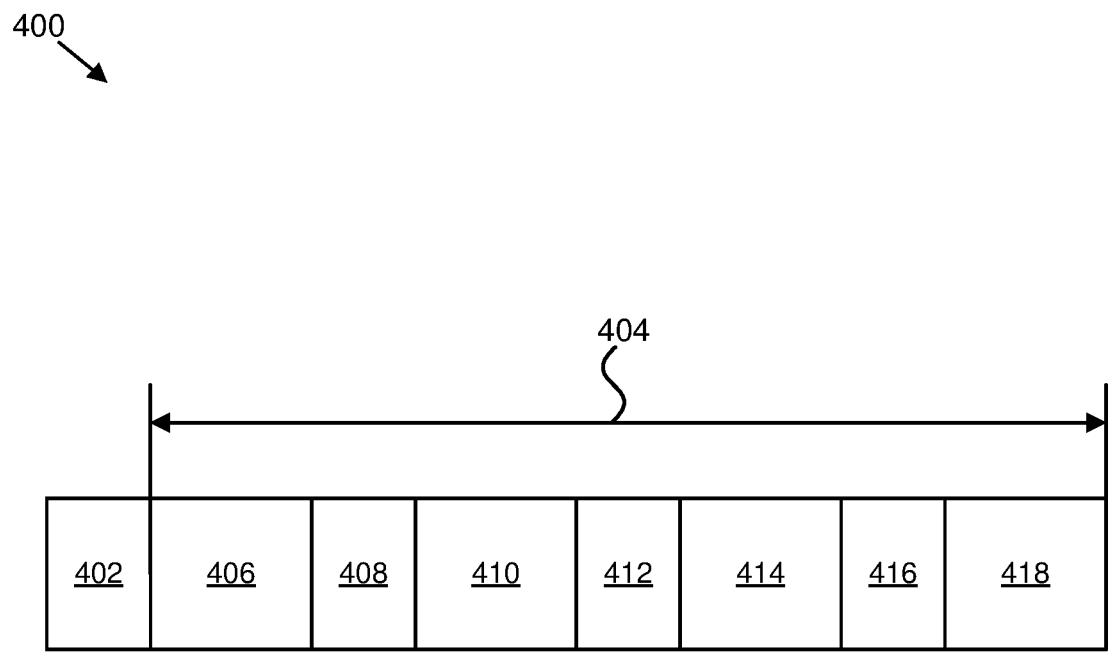
FIG. 4 is a schematic block diagram illustrating one embodiment of a system timing for channel occupancy across a single COT for multiple beams.

In a first embodiments, there may be a common COT for a device across all beams based on a directional LBT. In the first embodiment, if a device is scheduled to transmit on a first beam in an unlicensed band, then it is expected and/or required to initiate a COT based on successful LBT on a first beam. Further, once the first transmission is done on the first beam in the COT, then the channel may remain occupied (e.g., provided COT has not yet expired) and a user equipment ("UE") is not required, expected, and/or configured to initiate more than one COT at a given time in following two conditions: 1) if there is second transmission on the first beam that starts before the expiry of a maximum allowed transmission gap between two transmissions on a same beam; or 2) if there is a second transmission on the second beam before the expiry of the maximum allowed transmission gap between two transmission on different beams. The transmitter may share the remaining on-going COT of the first beam with the second beam, as shown in FIG. 4. A similar channel access procedure may be followed for following transmissions on different beams.

FIG. 4 is a schematic block diagram illustrating one embodiment of a system timing 400 for channel occupancy across a single COT for multiple beams. First, a CCA 402 for a first beam is sent, prior to a COT 404. The COT 404 includes a first transmission 406 (TX1) on the first beam, a short LBT 408 for a second beam, a second transmission 410 (TX2) on the second beam, a short LBT 412 on the first beam, a third transmission 414 (TX3) on the first beam, a short LBT 416 on the second beam, and a fourth transmission 418 (TX4) on the second beam.

In one implementation of the first embodiment, if a device is indicated or intending to transmit multiple transmissions in an unlicensed band, where transmission 1 is scheduled on beam 1, transmission 2 on beam 2, transmission 3 on beam 2, and transmission 4 on beam 2, then the device may perform directional LBT before the transmission 1 on beam 1 and upon success, COT is initiated. Following transmission 1 and before the start of transmission 2 on beam 2, the device may perform short directional LBT on beam 2 and upon successful LBT on beam 2, the device will start transmission 2 on beam 2 using the remaining COT duration that was initiated by the transmitter device before transmission 1 on beam 1. Following transmission 2 on beam 2, the device can simply start transmission 3 on beam 1 as the LBT was done beam 1 already before transmission 1 (e.g., provided the gap between two transmissions is within the regulatory requirements). Similarly, transmission 4 on beam 2 can start without LBT. Basically, the transmitter device is required to perform LBT (e.g., CCA) on a given beam only once within the same COT, unless the gap between any two consecutive transmissions is more than certain time duration, for example 25 us, in which case long LBT is done, otherwise a short LBT if the gap is between range of time duration, for example between 16 us and 25 us; it should be noted that the values of 16 microseconds and 25 microseconds are used here with reference to the timing definitions applicable to an unlicensed carrier usage between 5 and 7 GHz; other values may become applicable at other carrier frequency ranges, such as in mmWave above 28 GHz or beyond 52.6 GHz. In general, the transmitter device is required to perform LBT (e.g., CCA) on a given beam only once within the same COT unless the gap between any two consecutive transmissions is longer than a first predetermined duration (e.g., 25 microseconds in 5-7 GHz, or 13 microseconds beyond 52.6 GHz) in which case a long LBT is done, or unless the gap between any two consecutive transmissions is longer than a second predetermined duration (e.g., 16 microseconds in 5-7 GHz, or 3 microseconds beyond 52.6 GHz) and shorter than a third predetermined duration (e.g., 25 microseconds in 5-7 GHz, or 13 microseconds beyond 52.6 GHz) in which case a short LBT is done. In another implementation, the first and third predetermined durations are equal. In a further implementation, the duration of a short LBT is equal to the second or third predetermined duration.

In various implementations of the first embodiment, if a device is indicated or intending to transmit multiple transmissions in an unlicensed band, where transmission 1 is scheduled on beam 1, transmission 2 on beam 2, and transmission 3 on beam 3, then the device will perform directional CCA before the transmission 1 on beam 1 and upon LBT success, channel occupancy could be shared for the transmission 2 on beam 2 and transmission 3 on beam 3 which may happen parallel to the first transmission on beam 1.

In another implementation of the first embodiment, if a device is indicated or intending to transmit multiple data transmissions in an unlicensed band, where transmission 1 is scheduled on beam 1, transmission 2 on beam 2, transmission 3 on beam 2, and transmission 4 on beam 2, then a UE may perform CCA on both beam 1 and beam 2 at the beginning of initiating COT. Once the CCA is successful for even one of the beams, COT is initiated. However, transmission is allowed only on beams where the CCA is successful. In another example of this implementation, COT is initiated only if CCA is successful for both beams on which transmission is scheduled.

In a further implementation of the first embodiment, if a device is indicated or configured to transmit multiple transmissions in an unlicensed band, where transmission 1 is scheduled on beam 1, transmission 2 on beam 2, transmission 3 on beam 2, and transmission 4 on beam 2, then the device may perform directional CCA on only beam 1 at the beginning of initiating COT. Once the CCA is successful, COT is initiated. Following transmissions on any of the beams are not required to perform any LBT and/or CCA.

In one example, a first beam and a second beam may be transmitted from the same or different transmission and reception points ("TRPs").

In another example, the multiple transmissions on multiple beams are done simultaneously, i.e., using spatial domain multiplexing. In this example, directional LBT on multiple beams and/or omni-directional LBT are done only at the beginning, i.e., before the start of transmissions.

In a further example, multiple transmissions on multiple beams are done via time domain multiplexing.

In another example, a transmitter device may perform directional CCA on only beam 1 at the beginning of initiating COT. Once the CCA is successful, COT is initiated and, if the transmitter is configured to share the remaining COT duration with the second beam, then the transmitter is required to perform only short directional LBT on the second beam or no LBT based on certain criteria which is one of the following: 1) if CCA is performed for the first beam based on a QCL Type-D assumption where the source reference signal ("RS") is a synchronization signal block ("SSB") where a possibly wider beam is used and for the other beams to be shared within the same COT, no LBT is needed with the QCL type-D assumption where the source RS is a channel state information ("CSI") RS ("CSI-RS") where possibly narrower beams are used. In such a configuration, the transmitter does not need to perform LBT for the second beam if the narrower beam spatial direction is within the spatial direction of the wider beam—in other words, the boresight direction and angle of the second beam is within the boresight direction and angle of the second beam; 2) if CCA is performed for the first beam based on a QCL Type-D assumption where the source RS is SSB where a possibly wider beam is used and for the other beams to be shared within the same COT, short LBT is needed with the QCL t e-D assumption where the source RS is CSI-RS where the possibly narrower beams are used—the transmitter performs short LBT for the second beam, if the narrower second beam spatial direction is partially overlapping or outside the spatial direction of the wider first beam—in other words, the boresight direction and angle of the second beam is partially overlapping or outside the boresight direction and angle of the second beam; and/or 3) the decision to perform no LBT or short LBT is based on the absolute relative boresight angle which may be configurable by signaling or specified in a standard. No LBT is performed if the absolute relative boresight angle is within the first configured value and short LBT is performed if the absolute relative boresight angle is within the second configured value. COT sharing among beams is not performed if the absolute relative boresight angle is above a second configured value.

In one example, the sensing beam direction can be determined at the UE based on beam correspondence, where the spatial filter or the QCL assumption or the TCI state for the transmission beam is also used for the spatial filter or the QCL assumption or the TCI state for the corresponding sensing beam.

Figure 5:
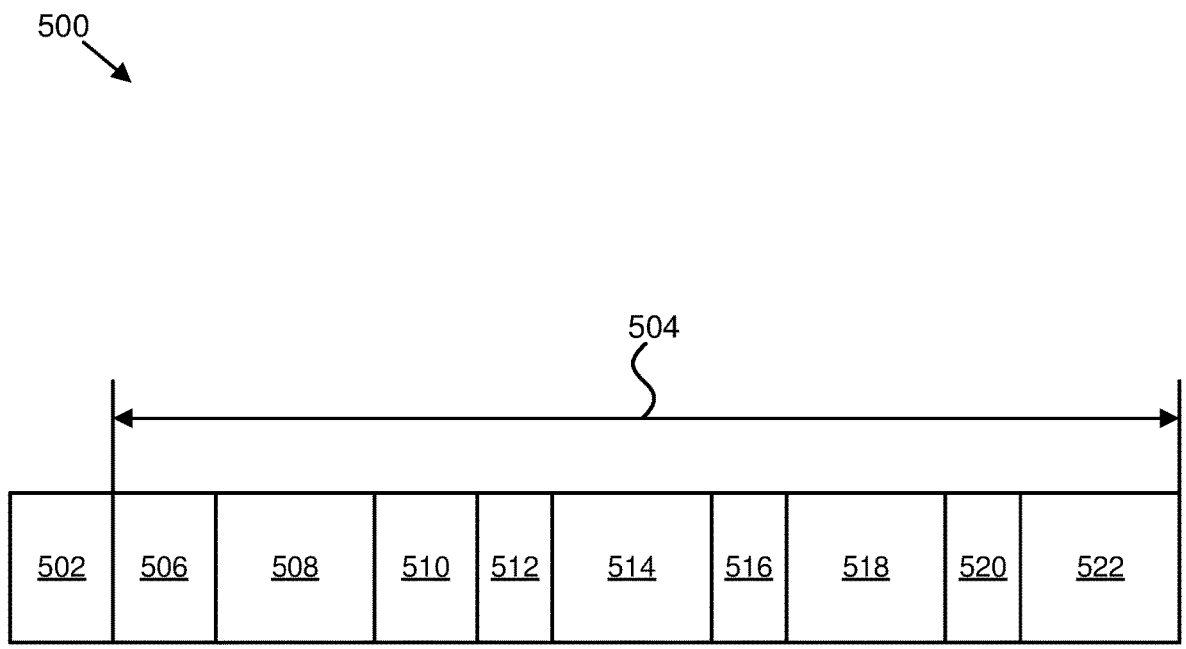
FIG. 5 is a schematic block diagram illustrating one embodiment of a system timing for omni-directional LBT based device-initiated COT for directional beam access.

In a second embodiment, there may be a common COT for a device across all beams based on an omni-directional LBT. According to the second embodiment, COT may be initiated upon a successful omni-direction LBT; however, to allow transmissions for a device on beams, the device is required to perform directional LBT within the already initiated COT, as shown in FIG. 5. Basically, a channel is accessed in an omni-directional manner, but the beam is accessed using directional LBT.

FIG. 5 is a schematic block diagram illustrating one embodiment of a system timing 500 for omni-directional LBT based device-initiated COT for directional beam access. First, an omni-directional CCA 502 is sent, prior to a COT 504. The COT 504 includes a directional CCA 506 for a first beam, a first transmission 508 (TX1) on the first beam, a gap 510, a directional CCA 512 for a second beam, a second transmission 514 (TX2) on the second beam, a gap 516, a third transmission 518 (TX3) on the first beam, a gap 520, and a fourth transmission 522 (TX4) on the second beam.

In some embodiments, a COT may be initiated upon a successful omni-direction LBT; however, to allow transmissions for a device on beams, the device is allowed to perform transmissions on beams where the regulatory requirements may be satisfied in terms of potential interference to other systems or operators. Long term interference statistics for beams may be used to apply no LBT mechanism for beam access such as DFS, ATPC, etc. Basically, a channel is accessed in an omni-directional manner, but the beam is accessed using no LBT based on a fair co-existence mechanism to allow the interference level within certain thresholds based on regulatory requirements.

Figure 6:
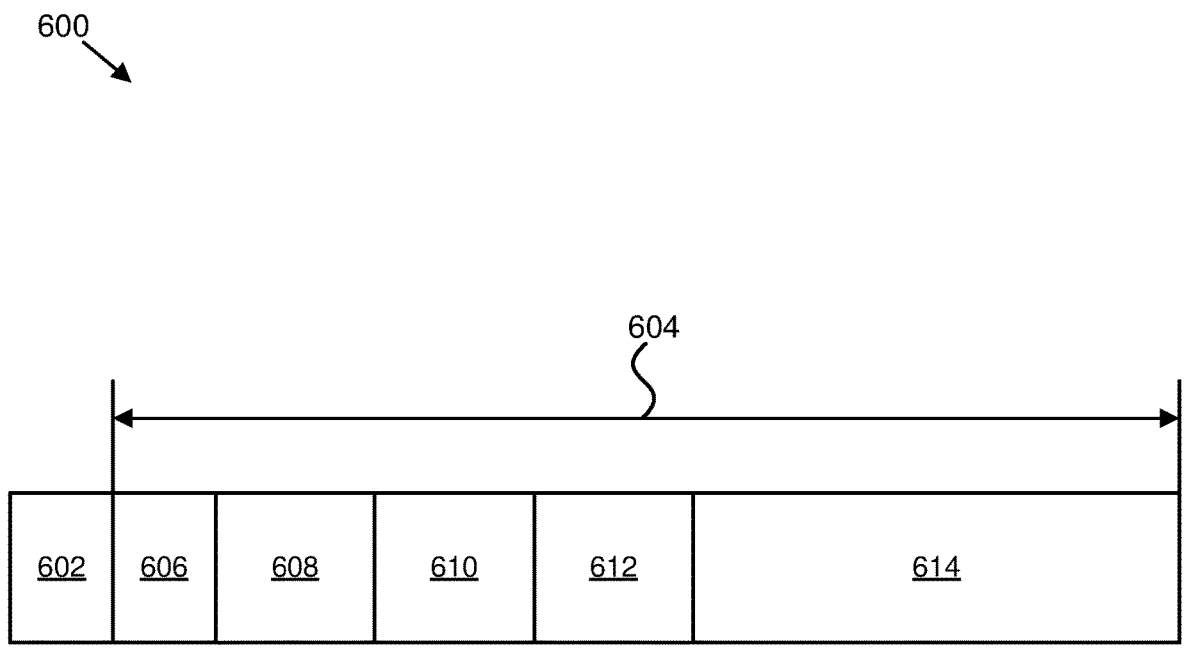
FIG. 6 is a schematic block diagram illustrating one embodiment of a system timing for omni-directional LBT based device-initiated COT with initial omni-directional transmission.

In a third embodiment, there may be a common COT for a device across all beams based on an omni-directional LBT and an initial omni-directional transmission. According to the third embodiment, a COT may be initiated by a device upon a successful omni-direction LBT, with a short LBT or no LBT required for further omni-directional or directional transmissions within the same COT, provided that the initial transmission after the omni-directional CCA is an omni-directional transmission for at least a predetermined duration. FIG. 6 shows an example where no LBT is required prior to directional transmissions 2, 3, and 4 since the CCA was omni-directional and the initial transmission in the COT is an omni-directional transmission.

According to one implementation of the third embodiment, the maximum COT duration is a function of the duration of the omni-directional transmission, so that longer omni-directional duration allows a longer maximum COT.

According to another implementation of the third embodiment, the predetermined duration of the omni-directional transmission is sufficient for transmission of a control resource set ("CORESET") in NR. According to a further implementation of the third embodiment, the predetermined duration of the omni-directional transmission is sufficient for transmission of a synchronization signal ("SS") and/or physical broadcast channel ("PBCH") ("SS/PBCH") block in NR. According to one implementation of the third embodiment, the predetermined duration of the omni-directional transmission is configured or indicated to the device.

According to one implementation of the third embodiment, the same COT may also be used between and initiating and responding device to transmit using corresponding beams. For example, if there is a UE initiated COT by sensing on one or multiple beams to perform UL transmission on one or multiple beams, then the same COT can also be used by the received device (e.g., gNB and/or TRP) for sending transmission to the same UE or vice-versa. From the UE perspective, it is still used by one device for transmission and reception.

FIG. 6 is a schematic block diagram illustrating one embodiment of a system timing 600 for omni-directional LBT based device-initiated COT with initial omni-directional transmission. First, an omni-directional CCA 602 is sent, prior to a COT 604. The COT 604 includes a first transmission 606 (TX1) (e.g., omni-directional transmission), a second transmission 608 (TX2) on a first beam, a third transmission 610 (TX3) on a second beam, a fourth transmission 612 (TX4) on the first beam, and a gap 614.

In a fourth embodiment, there may be beam-specific COTs with common measurement of transmission gaps across all those COTs. According to the fourth embodiment, a device may be expected and/or required to initiate a first COT whenever it needs to transmit on a first beam, for which there is no on-going COT. Further, once the first transmission is done on the first beam in the first COT, then the channel may still remain occupied (e.g., provided the first COT has not yet expired) in following two conditions: 1) if there is second transmission on the first beam that starts before the expiry of a maximum allowed transmission gap 1 between two transmissions on the same beam; or 2) if there is at least one second overlapping (e.g., partially or completely) COT for a second beam of the same device where either the transmission is on-going or starts before a maximum allowed transmission gap 2 with respect to the end of the first transmission on a first beam in a first COT, as shown in FIG. 7.

Figure 7:
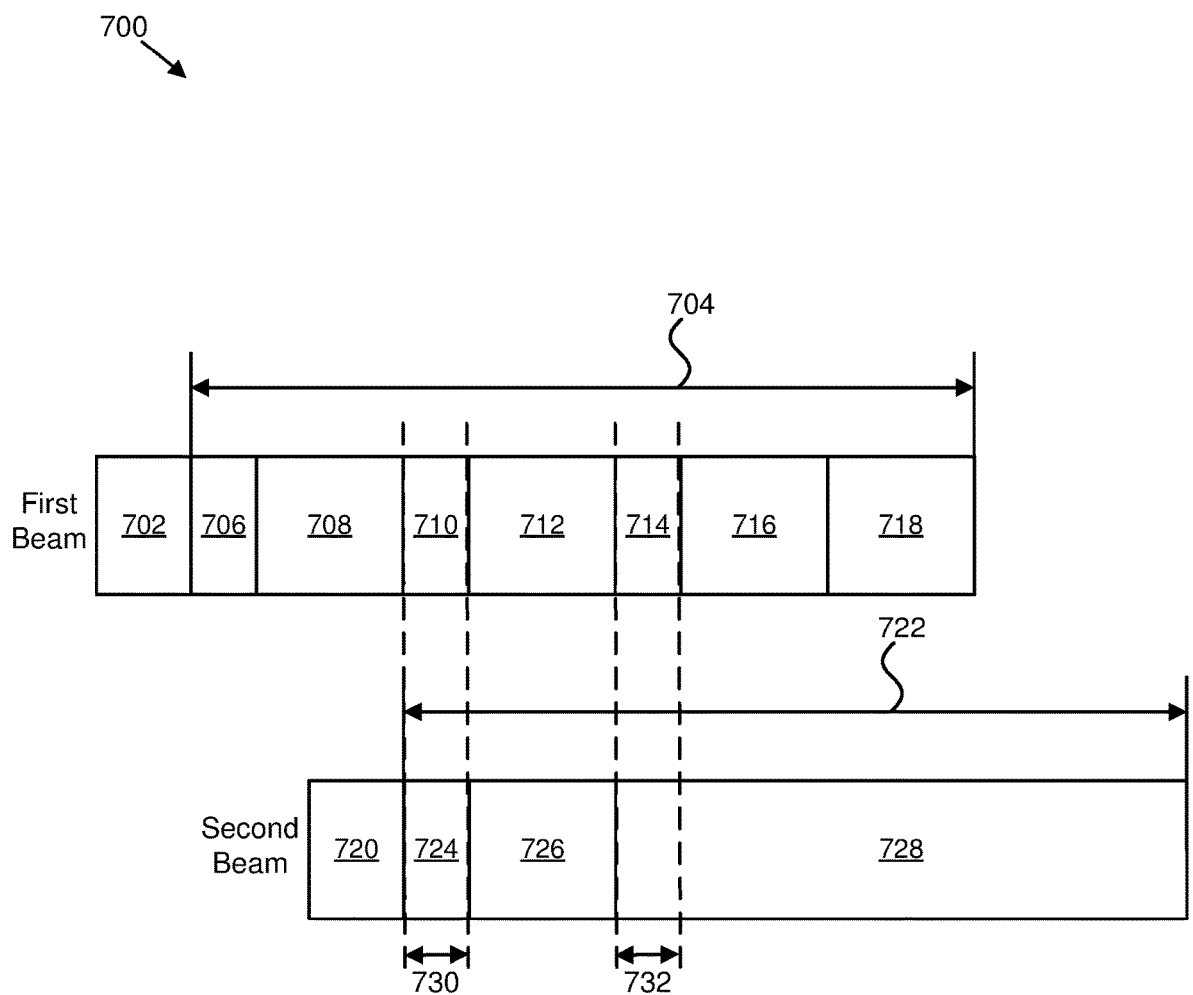
FIG. 7 is a schematic block diagram illustrating one embodiment of a system timing for channel occupancy across multiple COTs for multiple beams.

FIG. 7 is a schematic block diagram illustrating one embodiment of a system timing 700 for channel occupancy across multiple COTs for multiple beams. For a first beam, a CCA 702 is sent prior to a COT 704. The COT 704 includes a first gap 706, a first transmission 708 (TX1) on the first beam, a second gap 710, an occupied period 712 (e.g., occupied by a second beam transmission), a third gap 714, a second transmission 716 (TX2) on the first beam, and a fourth gap 718. For a second beam, a CCA 720 is sent prior to a COT 722. The COT 722 includes a first gap 724, a first transmission 726 (TX1) on the second beam, and a second gap 728. A first overlapping gap 730 and a second overlapping gap 732 are allowed TX gaps across two COTs (e.g., COT 704 and COT 722).

In one implementation of the fourth embodiment, a maximum COT ("MCOT") value is individually applied to each of the COTs associated with each of the beams of a given device. Therefore, the overall occupancy for the device may be much longer if it is transmitting on multiple beams in a sequential manner. In another implementation of the fourth embodiment, multiple COTs may be initiated by a device corresponding to multiple beams, but the MCOT may be per device (e.g., summation of the non-overlapping COT durations for multiple beams cannot exceed the MCOT value).

Figure 8:
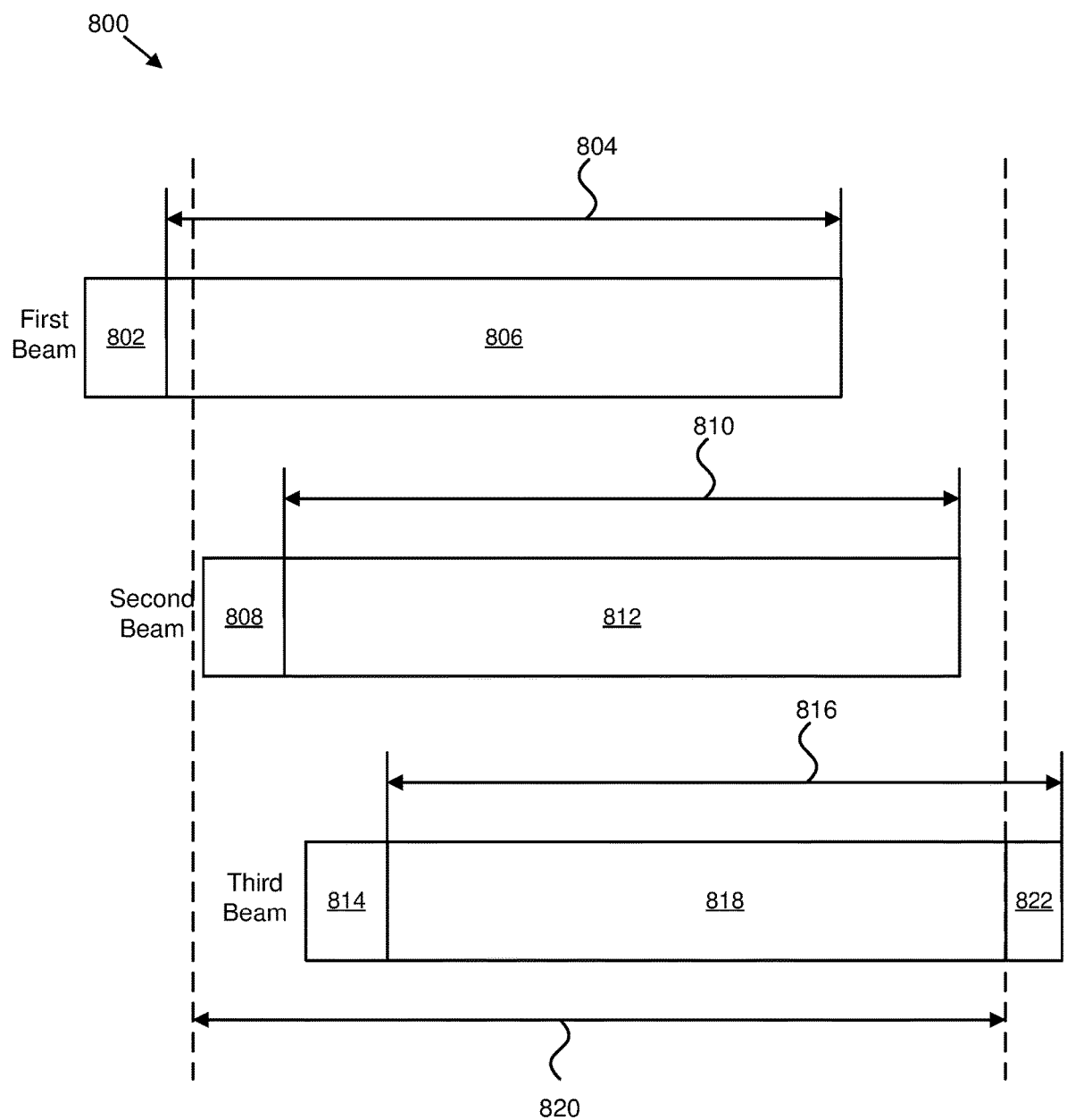
FIG. 8 is a schematic block diagram illustrating one embodiment of a system timing for beam specific COTs within the device's MCOT duration.

FIG. 8 is a schematic block diagram illustrating one embodiment of a system timing 800 for beam specific COTs within the device's MCOT duration. For a first beam, a CCA 802 is sent prior to a COT 804 (COT1). The COT 804 includes one or more transmissions 806. For a second beam, a CCA 808 is sent prior to a COT 810 (COT2). The COT 810 includes one or more transmissions 812. For a third beam, a CCA 814 is sent prior to a COT 816 (COT3). The COT 816 includes one or more transmissions 818. A time period 820 may be for an MCOT. The COT 816 for the third beam may be trimmed by the MCOT to not include portion 822.

As shown in FIG. 8, COT1, COT2, and COT3 are contained within the MCOT duration of the device. The duration of COT3 is trimmed to be contained within the overall MCOT duration. In one example, a device may be configured with two values for MCOT: one MCOT device value according to regulatory requirements and another MCOT beam value that should be less than or equal to the MCOT device value.

In another implementation of the fourth embodiment, a maximum allowed transmissions gap (e.g., to apply short or long LBT) is the same whether the following transmission is on the same beam within the corresponding COT or the following transmission is on another beam within another corresponding COT. In a further implementation of the fourth embodiment, a device may be configured with two different values for a maximum allowed transmission gap. The first transmission gap (e.g., to apply short or long LBT) may be according to regulatory requirements where this gap is applicable across different COTs. The second transmission gap may be equal to or less than the first transmission gap where this gap is applicable within the same COT.

Figure 9:
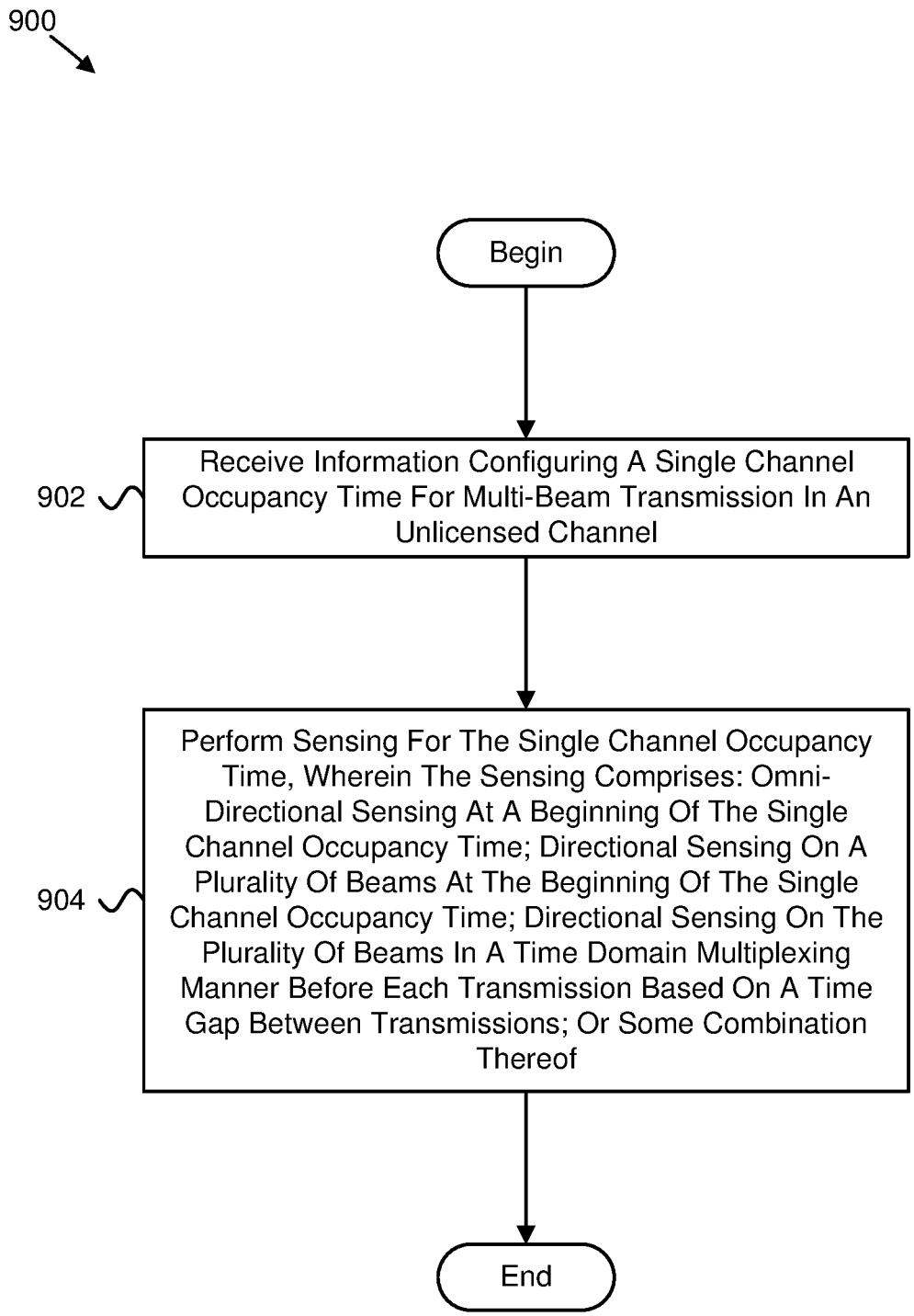
FIG. 9 is a flow chart diagram illustrating one embodiment of a method for performing channel occupancy time sensing.

FIG. 9 is a flow chart diagram illustrating one embodiment of a method 900 for performing channel occupancy time sensing. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

In various embodiments, the method 900 includes receiving 902 information configuring a single channel occupancy time for multi-beam transmission in an unlicensed channel. In some embodiments, the method 900 includes performing 904 sensing for the single channel occupancy time. The sensing includes: omni-directional sensing at a beginning of the single channel occupancy time; directional sensing on a plurality of beams at the beginning of the single channel occupancy time; directional sensing on the plurality of beams in a time domain multiplexing manner before each transmission based on a time gap between transmissions; or some combination thereof.

In certain embodiments, the single channel occupancy time is applied for multi-beam transmissions, and the multi-beam transmissions comprise: spatial division multiplexing; time division multiplexing; or some combination thereof. In some embodiments, the omni-directional sensing comprises: sensing in a plurality of directions; sensing on a wider beam than the transmission beams; or some combination thereof. In various embodiments, the method 900 further comprises transmitting a first transmission in the single channel occupancy time using a first beam in response to a first successful clear channel assessment for the first beam.

In one embodiment, the method 900 further comprises transmitting a second transmission in the single channel occupancy time in response to: the second transmission being configured for transmission; and a gap between an end of the first transmission and a start of the second transmission being less than a threshold gap value. In certain embodiments, the second transmission is configured for transmission on the first beam, and the threshold gap value corresponds to transmission on the same beam. In some embodiments, the second transmission is configured for transmission on a second beam, and the threshold gap value corresponds to transmission on different beams.

In various embodiments, the sensing comprises directional sensing on the plurality of beams in the time domain multiplexing manner before each transmission, and the directional sensing on the plurality of beams before each of the corresponding transmissions comprises performing a clear channel assessment on each beam of the plurality of beams before performing a transmission on that beam. In one embodiment, the sensing comprises directional sensing on the plurality of beams at the beginning of the single channel occupancy time, and the directional sensing on the plurality of beams at the beginning of the single channel occupancy time comprises performing a clear channel assessment on multiple beams of the plurality of beams before initiating the single channel occupancy time, and initiating the single channel occupancy time in response to at least one beam of the multiple beams having a successful clear channel assessment.

In certain embodiments, transmission is enabled only for beams of the multiple beams having the successful clear channel assessment. In some embodiments, the sensing comprises omni-directional sensing at a beginning of the single channel occupancy time, and the omni-directional sensing at a beginning of the single channel occupancy time comprises performing an omni-directional clear channel assessment before initiating the single channel occupancy time, and initiating the single channel occupancy time in response to the omni-directional clear channel assessment being successful. In various embodiments, the method 900 further comprises performing additional sensing in the single channel occupancy time before a transmission in response to the time gap between the transmission and a previous transmission is above a threshold time gap.

In one embodiment, a method of a user equipment comprises: receiving information configuring a single channel occupancy time for multi-beam transmission in an unlicensed channel; and performing sensing for the single channel occupancy time, wherein the sensing comprises: omni-directional sensing at a beginning of the single channel occupancy time; directional sensing on a plurality of beams at the beginning of the single channel occupancy time; directional sensing on the plurality of beams in a time domain multiplexing manner before each transmission based on a time gap between transmissions; or some combination thereof.

In certain embodiments, the single channel occupancy time is applied for multi-beam transmissions, and the multi-beam transmissions comprise: spatial division multiplexing; time division multiplexing; or some combination thereof.

In some embodiments, the omni-directional sensing comprises: sensing in a plurality of directions; sensing on a wider beam than the transmission beams; or some combination thereof.

In various embodiments, the method further comprises transmitting a first transmission in the single channel occupancy time using a first beam in response to a first successful clear channel assessment for the first beam.

In one embodiment, the method further comprises transmitting a second transmission in the single channel occupancy time in response to: the second transmission being configured for transmission; and a gap between an end of the first transmission and a start of the second transmission being less than a threshold gap value.

In certain embodiments, the second transmission is configured for transmission on the first beam, and the threshold gap value corresponds to transmission on the same beam.

In some embodiments, the second transmission is configured for transmission on a second beam, and the threshold gap value corresponds to transmission on different beams.

In various embodiments, the sensing comprises directional sensing on the plurality of beams in the time domain multiplexing manner before each transmission, and the directional sensing on the plurality of beams before each of the corresponding transmissions comprises performing a clear channel assessment on each beam of the plurality of beams before performing a transmission on that beam.

In one embodiment, the sensing comprises directional sensing on the plurality of beams at the beginning of the single channel occupancy time, and the directional sensing on the plurality of beams at the beginning of the single channel occupancy time comprises performing a clear channel assessment on multiple beams of the plurality of beams before initiating the single channel occupancy time, and initiating the single channel occupancy time in response to at least one beam of the multiple beams having a successful clear channel assessment.

In certain embodiments, transmission is enabled only for beams of the multiple beams having the successful clear channel assessment.

In some embodiments, the sensing comprises omni-directional sensing at a beginning of the single channel occupancy time, and the omni-directional sensing at a beginning of the single channel occupancy time comprises performing an omni-directional clear channel assessment before initiating the single channel occupancy time, and initiating the single channel occupancy time in response to the omni-directional clear channel assessment being successful.

In various embodiments, the method further comprises performing additional sensing in the single channel occupancy time before a transmission in response to the time gap between the transmission and a previous transmission is above a threshold time gap.

In one embodiment, an apparatus comprises a user equipment. The apparatus further comprises: a receiver that receives information configuring a single channel occupancy time for multi-beam transmission in an unlicensed channel; and a processor that performs sensing for the single channel occupancy time, wherein the sensing comprises: omni-directional sensing at a beginning of the single channel occupancy time; directional sensing on a plurality of beams at the beginning of the single channel occupancy time; directional sensing on the plurality of beams in a time domain multiplexing manner before each transmission based on a time gap between transmissions; or some combination thereof.

In certain embodiments, the single channel occupancy time is applied for multi-beam transmissions, and the multi-beam transmissions comprise: spatial division multiplexing; time division multiplexing; or some combination thereof.

In some embodiments, the omni-directional sensing comprises: sensing in a plurality of directions; sensing on a wider beam than the transmission beams; or some combination thereof.

In various embodiments, the apparatus further comprises a transmitter that transmits a first transmission in the single channel occupancy time using a first beam in response to a first successful clear channel assessment for the first beam.

In one embodiment, the transmitter transmits a second transmission in the single channel occupancy time in response to: the second transmission being configured for transmission; and a gap between an end of the first transmission and a start of the second transmission being less than a threshold gap value.

In certain embodiments, the second transmission is configured for transmission on the first beam, and the threshold gap value corresponds to transmission on the same beam.

In some embodiments, the second transmission is configured for transmission on a second beam, and the threshold gap value corresponds to transmission on different beams.

In various embodiments, the sensing comprises directional sensing on the plurality of beams in the time domain multiplexing manner before each transmission, and the directional sensing on the plurality of beams before each of the corresponding transmissions comprises performing a clear channel assessment on each beam of the plurality of beams before performing a transmission on that beam.

In one embodiment, the sensing comprises directional sensing on the plurality of beams at the beginning of the single channel occupancy time, and the directional sensing on the plurality of beams at the beginning of the single channel occupancy time comprises performing a clear channel assessment on multiple beams of the plurality of beams before initiating the single channel occupancy time, and initiating the single channel occupancy time in response to at least one beam of the multiple beams having a successful clear channel assessment.

In certain embodiments, transmission is enabled only for beams of the multiple beams having the successful clear channel assessment.

In some embodiments, the sensing comprises omni-directional sensing at a beginning of the single channel occupancy time, and the omni-directional sensing at a beginning of the single channel occupancy time comprises performing an omni-directional clear channel assessment before initiating the single channel occupancy time, and initiating the single channel occupancy time in response to the omni-directional clear channel assessment being successful.

In various embodiments, the processor performs additional sensing in the single channel occupancy time before a transmission in response to the time gap between the transmission and a previous transmission is above a threshold time gap.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at a user equipment (UE), the method comprising:
receiving information configuring a single channel occupancy time (COT) for multi-beam transmission in an unlicensed channel; and
performing sensing for the single COT, wherein the sensing comprises:
omni-directional sensing at a beginning of the single COT;
directional sensing on a plurality of beams at the beginning of the single COT;
directional sensing on the plurality of beams in a time domain multiplexing manner before each transmission based on a time gap between transmissions;
or a combination thereof.

2. The method of claim 1, wherein the single COT is applied for multi-beam transmissions, and the multi-beam transmissions comprise:
spatial division multiplexing;
time division multiplexing;
or a combination thereof.

3. The method of claim 1, wherein the omni-directional sensing comprises:
sensing in a plurality of directions;
sensing on a wider beam than the transmission beams;
or a some combination thereof.

4. The method of claim 1, further comprising transmitting a first transmission in the single COT using a first beam in response to a first successful clear channel assessment (CCA) for the first beam.

5. The method of claim 4, further comprising transmitting a second transmission in the single COT in response to:
the second transmission being configured for transmission; and
a gap between an end of the first transmission and a start of the second transmission being less than a threshold gap value.

6. The method of claim 5, wherein the second transmission is configured for transmission on the first beam, and the threshold gap value corresponds to transmission on the same beam.

7. The method of claim 5, wherein the second transmission is configured for transmission on a second beam, and the threshold gap value corresponds to transmission on different beams.

8. The method of claim 1, wherein the sensing comprises directional sensing on the plurality of beams in the time domain multiplexing manner before each transmission, and the directional sensing on the plurality of beams before each of the corresponding transmissions comprises performing a clear channel assessment (CCA) on each beam of the plurality of beams before performing a transmission on that beam.

9. The method of claim 1, wherein the sensing comprises directional sensing on the plurality of beams at the beginning of the single COT, and the directional sensing on the plurality of beams at the beginning of the single COT comprises performing a clear channel assessment (CCA) on multiple beams of the plurality of beams before initiating the single COT, and initiating the single COT in response to at least one beam of the multiple beams having a successful CCA.

10. The method of claim 9, wherein transmission is enabled only for beams of the multiple beams having the successful CCA.

11. The method of claim 1, wherein the sensing comprises omni-directional sensing at a beginning of the single COT, and the omni-directional sensing at a beginning of the single COT comprises performing an omni-directional clear channel assessment (CCA) before initiating the single COT, and initiating the single COT in response to the omni-directional CCA being successful.

12. The method in claim 11, further comprising performing additional sensing in the single COT before a transmission in response to the time gap between the transmission and a previous transmission is above a threshold time gap.

13. An apparatus for wireless communication, the apparatus comprising:
a processor; and
a memory coupled to the processor, the memory comprising instructions executable by the processor to cause the apparatus to:
receive information configuring a single channel occupancy time (COT) for multi-beam transmission in an unlicensed channel; and perform sensing for the single COT, wherein the sensing comprises:
  omni-directional sensing at a beginning of the single COT;
  directional sensing on a plurality of beams at the beginning of the single COT;
  directional sensing on the plurality of beams in a time domain multiplexing manner before each transmission based on a time gap between transmissions;
  or a combination thereof.

14. The apparatus of claim 13, wherein the instructions are further executable by the processor to cause the apparatus to transmit a first transmission in the single COT using a first beam in response to a first successful clear channel assessment (CCA) for the first beam.

15. The apparatus of claim 14, wherein the instructions are further executable by the processor to cause the apparatus to transmit a second transmission in the single COT in response to:
  the second transmission being configured for transmission; and
  a gap between an end of the first transmission and a start of the second transmission being less than a threshold gap value.

16. The apparatus of claim 15, wherein the second transmission is configured for transmission on the first beam, and the threshold gap value corresponds to transmission on the same beam.

17. The apparatus of claim 15, wherein the second transmission is configured for transmission on a second beam, and the threshold gap value corresponds to transmission on different beams.

18. The apparatus of claim 13, wherein the single COT is applied for multi-beam transmissions, and the multi-beam transmissions comprise:
  spatial division multiplexing;
  time division multiplexing;
  or a combination thereof.

19. The apparatus of claim 13, wherein the omni-directional sensing comprises:
  sensing in a plurality of directions;
  sensing on a wider beam than the transmission beams;
  or a combination thereof.

20. The apparatus of claim 13, wherein the sensing comprises directional sensing on the plurality of beams in the time domain multiplexing manner before each transmission, and the directional sensing on the plurality of beams before each of the corresponding transmissions comprises performing a clear channel assessment (CCA) on each beam of the plurality of beams before performing a transmission on that beam.

* * * * *